(12) United States Patent
Nitta

(10) Patent No.: US 12,216,335 B2
(45) Date of Patent: Feb. 4, 2025

(54) IMAGING LENS

(71) Applicant: TOKYO VISIONARY OPTICS Co., Ltd., Tokyo (JP)

(72) Inventor: Koji Nitta, Tokyo (JP)

(73) Assignee: TOKYO VISIONARY OPTICS Co., Ltd., Tokyo (JP)

( * ) Notice: Subject to any disclaimer, the term of this patent is extended or adjusted under 35 U.S.C. 154(b) by 583 days.

(21) Appl. No.: 17/391,713

(22) Filed: Aug. 2, 2021

(65) Prior Publication Data

US 2021/0356700 A1  Nov. 18, 2021

Related U.S. Application Data

(63) Continuation of application No. 16/811,939, filed on Mar. 6, 2020, now Pat. No. 11,513,319.

(30) Foreign Application Priority Data

Mar. 7, 2019 (JP) .................................. 2019-041117

(51) Int. Cl.
| | | |
|---|---|---|
| *G02B 9/64* | (2006.01) | |
| *G02B 13/00* | (2006.01) | |
| *G02B 13/18* | (2006.01) | |
| G02B 3/02 | (2006.01) | |
| G02B 3/04 | (2006.01) | |
| G02B 5/00 | (2006.01) | |

(52) U.S. Cl.
CPC ............... *G02B 9/64* (2013.01); *G02B 13/18* (2013.01); *G02B 3/02* (2013.01); *G02B 3/04* (2013.01); *G02B 5/005* (2013.01); *G02B 13/0045* (2013.01)

(58) Field of Classification Search
CPC . G02B 9/64; G02B 13/18; G02B 3/02; G02B 3/04; G02B 13/0045; G02B 27/0028
See application file for complete search history.

(56) References Cited

U.S. PATENT DOCUMENTS

| 11,966,014 B2* | 4/2024 | Li ....................... G02B 27/0025 |
| 2014/0376105 A1* | 12/2014 | Sekine ..................... G02B 3/02 |
| | | 359/708 |
| 2019/0278063 A1* | 9/2019 | Sekine ............... G02B 13/0045 |
| 2019/0310448 A1* | 10/2019 | Hashimoto ........ G02B 13/0045 |

(Continued)

FOREIGN PATENT DOCUMENTS

| CN | 108490582 A | 9/2018 |
| JP | H02257111 A | 10/1990 |
| JP | 2017049347 A | 3/2017 |

*Primary Examiner* — Zachary W Wilkes
*Assistant Examiner* — Anna Smith
(74) *Attorney, Agent, or Firm* — Maine Cernota & Curran

(57) ABSTRACT

There is provided an imaging lens with excellent optical characteristics which satisfies demand of wide field of view, low profile and low F-number. An imaging lens comprises, in order from an object side to an image side, a first lens with positive or negative refractive power in a paraxial region, a second lens with positive or negative refractive power in a paraxial region, a third lens with positive refractive power in a paraxial region, a fourth lens with negative refractive power in a paraxial region, a fifth lens with positive refractive power in a paraxial region, a sixth lens with positive refractive power in a paraxial region, and a seventh lens with negative refractive power.

7 Claims, 5 Drawing Sheets

(56) References Cited

U.S. PATENT DOCUMENTS

| | | | |
|---|---|---|---|
| 2022/0137371 A1* | 5/2022 | Chen | H04N 23/55 |
| | | | 359/708 |
| 2022/0159156 A1* | 5/2022 | Zhang | G02B 13/04 |
| 2022/0308317 A1* | 9/2022 | Wang | G02B 9/64 |
| 2023/0123067 A1* | 4/2023 | Yang | G02B 13/18 |
| | | | 359/755 |

* cited by examiner

IMAGING LENS

The present application is based on and claims priority of a Japanese patent application No. 2019-041117 filed on Mar. 7, 2019, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as home appliances, information terminal equipment, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in Patent Document 1 (CN108490582A) below has been known.

Patent Document 1 discloses an imaging lens comprising, in order from an object side, a first lens having positive refractive power and a convex object-side surface, a second lens having a convex object-side surface and a concave image-side surface and having negative refractive power, a third lens having refractive power, a fourth lens having refractive power, a fifth lens having a concave object-side surface and a convex image-side surface and having negative refractive power, a sixth lens having a convex object-side surface with at least one inflection point and a convex image-side surface, and having positive refractive power in a paraxial region, and a seventh lens having a concave object-side surface and a concave image-side surface with at least one inflection point, and having negative refractive power in a paraxial region, wherein a relationship between a focal length of the overall optical system and a composite focal length of the first lens to the sixth lens, a relationship between a focal length of the third lens and a thickness of the third lens along the optical axis, and a relationship among a thickness of the fourth lens along the optical axis, a thickness of the fifth lens along the optical axis, a thickness of the sixth lens along the optical axis, an air interval between the fourth lens and the fifth lens along the optical axis and an air interval between the fifth lens and the sixth lens along the optical axis satisfy certain conditions.

SUMMARY OF THE INVENTION

However, in lens configurations disclosed in the Patent Document 1, when a wide field of view, a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low profile and the low F-number in well balance and excellently corrects aberrations.

Regarding terms used in the present invention, "a convex surface", "a concave surface" or "a plane surface" of lens surfaces implies that a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive or negative refractive power in a paraxial region, a second lens with positive or negative refractive power in a paraxial region, a third lens with positive refractive power in a paraxial region, a fourth lens with negative refractive power in a paraxial region, a fifth lens with positive refractive power in a paraxial region, a sixth lens with positive refractive power in a paraxial region, and a seventh lens with negative refractive power.

According to an imaging lens having the above-described configuration, the first lens properly corrects astigmatism and distortion.

The second lens properly corrects coma aberration, the astigmatism, field curvature and the distortion.

The third lens achieves reduction in a profile, and properly corrects spherical aberration, the field curvature and the distortion by strengthening refractive power.

The fourth lens properly corrects the astigmatism, the distortion and chromatic aberration.

The fifth lens maintains a low profile and properly corrects the astigmatism and the distortion.

The sixth lens maintains the low profile and properly corrects the coma aberration, the astigmatism, the field curvature and the distortion.

The seventh lens properly corrects the chromatic aberration, the astigmatism, the field curvature and the distortion.

According to the imaging lens having the above-described configuration, it is preferable that the first lens has an object-side surface being concave in a paraxial region.

When the first lens has the object-side surface being concave in the paraxial region, the astigmatism can be properly corrected.

According to the imaging lens having the above-described configuration, it is preferable that the first lens has an image-side surface being convex in a paraxial region.

When the first lens has the image-side surface being convex in the paraxial region, the astigmatism and the distortion can be properly corrected.

According to the imaging lens having the above-described configuration, it is preferable that the second lens has an object-side surface being convex in a paraxial region.

When the second lens has the object-side surface being convex in the paraxial region, the coma aberration, the field curvature and the distortion can be properly corrected.

According to the imaging lens having the above-described configuration, it is preferable that the second lens has an image-side surface being concave in a paraxial region.

When the second lens has the image-side surface being concave in the paraxial region, the coma aberration, the field curvature and the distortion can be properly corrected.

According to the imaging lens having the above-described configuration, it is preferable that the fourth lens has an object-side surface being concave in a paraxial region.

When the fourth lens has the object-side surface being concave in the paraxial region, a light ray incident angle to the object-side surface of the fourth lens can be appropriately controlled and the astigmatism and the distortion can be properly corrected.

According to the imaging lens having the above-described configuration, it is preferable that the fourth lens has an image-side surface being convex in a paraxial region.

When the fourth lens has the image-side surface being convex in the paraxial region, the astigmatism and the distortion can be properly corrected.

According to the imaging lens having the above-described configuration, it is preferable that the sixth lens has an object-side surface being convex in a paraxial region.

When the sixth lens has the object-side surface being convex in the paraxial region, the coma aberration, the astigmatism, the field curvature and the distortion can be properly corrected.

According to the imaging lens having the above-described configuration, it is preferable that the sixth lens has an image-side surface being concave in a paraxial region.

When the sixth lens has the image-side surface being concave in the paraxial region, the coma aberration, the astigmatism, the field curvature and the distortion can be properly corrected.

According to the imaging lens having the above-described configuration, it is preferable that the image-side surface of the sixth lens is formed as an aspheric surface having at least one pole point in a position off an optical axis.

When the image-side surface of the sixth lens is formed as the aspheric surface having at least one pole point in the position off an optical axis, the astigmatism, the field curvature and the distortion can be properly corrected.

According to the imaging lens having the above-described configuration, it is preferable that the seventh lens has an object-side surface being convex in a paraxial region.

When the seventh lens has the object-side surface being convex in the paraxial region, the astigmatism, the field curvature and the distortion can be properly corrected.

According to the imaging lens having the above-described configuration, it is preferable that the object-side surface of the seventh lens is formed as an aspheric surface having at least one pole point in a position off the optical axis.

When the object-side surface of the seventh lens is formed as the aspheric surface having at least one pole point in the position off the optical axis, the astigmatism, the field curvature and the distortion can be properly corrected.

According to the imaging lens having the above-described configuration, it is preferable that the seventh lens has an image-side surface being concave in a paraxial region.

When the seventh lens has the image-side surface being concave in the paraxial region, the astigmatism, the field curvature and the distortion can be properly corrected.

According to the imaging lens having the above-described configuration, it is preferable that the following conditional expression (1) is satisfied:

$$0.10 < (T1/TTL) \times 100 < 0.45 \qquad (1)$$

where

T1: a distance along the optical axis from an image-side surface of the first lens to an object-side surface of the second lens, and TTL: a total track length.

The conditional expression (1) defines an appropriate range of the distance along the optical axis between the first lens and the second lens. By satisfying the conditional expression (1), reduction in a profile can be achieved and the coma aberration and the astigmatism can be properly corrected.

According to the imaging lens having the above-described configuration, it is preferable that the following conditional expression (2) is satisfied:

$$10.00 < T2/T4 \qquad (2)$$

where

T2: a distance along the optical axis from an image-side surface of the second lens to an object-side surface of the third lens, and T4: a distance along the optical axis from an image-side surface of the fourth lens to an object-side surface of the fifth lens.

The conditional expression (2) defines an appropriate range of a relationship between the distance along the optical axis from the image-side surface of the second lens to the object-side surface of the third lens and the distance along the optical axis from the image-side surface of the fourth lens to the object-side surface of the fifth lens. By satisfying the conditional expression (2), the third lens and the fourth lens are arranged at optimum positions, and the distortion can be properly corrected.

According to the imaging lens having the above-described configuration, it is preferable that the following conditional expression (3) is satisfied:

$$13.00 < vd6 < 25.50 \qquad (3)$$

where vd6: an abbe number at d-ray of the sixth lens.

The conditional expression (3) defines an appropriate range of the abbe number at d-ray of the sixth lens. By satisfying the conditional expression (3), the chromatic aberration can be properly corrected.

According to the imaging lens having the above-described configuration, it is preferable that the following conditional expression (4) is satisfied:

$$0.10 < vd6/vd7 < 0.60 \qquad (4)$$

where vd6: an abbe number at d-ray of the sixth lens, and vd7: an abbe number at d-ray of the seventh lens.

The conditional expression (4) defines an appropriate range of the abbe numbers at d-ray of the sixth lens and the seventh lens. By satisfying the conditional expression (4), the chromatic aberration can be properly corrected.

According to the imaging lens having the above-described configuration, it is preferable that the following conditional expression (5) is satisfied:

$$0.20 < (D1/|f1|) \times 100 < 7.50 \qquad (5)$$

where

D1: a thickness of the first lens along the optical axis, and f1: a focal length of the first lens.

The conditional expression (5) defines an appropriate range of a relationship between the thickness of the first lens along the optical axis and the focal length of the first lens. When a value is below the upper limit of the conditional expression (5), the thickness of the first lens along the optical axis is suppressed from being too large, and reduction in the profile is achieved. Furthermore, refractive power of the first lens is suppressed from being large and the astigmatism and the distortion can be properly corrected. On the other hand, when the value is above the lower limit of the conditional expression (5), the thickness of the first lens along the optical axis is suppressed from being too small, and formability of the lens becomes excellent.

According to the imaging lens having the above-described configuration, it is preferable that the following conditional expression (6) is satisfied:

$$0.10<(T4/TTL)\times 100<0.40 \quad (6)$$

where

T4: a distance along the optical axis from an image-side surface of the fourth lens to an object-side surface of the fifth lens, and TTL: a total track length.

The conditional expression (6) defines an appropriate range of the distance along the optical axis between the fourth lens and the fifth lens. By satisfying the conditional expression (6), reduction in the profile can be achieved and the astigmatism and the distortion can be properly corrected.

According to the imaging lens having the above-described configuration, it is preferable that the following conditional expression (7) is satisfied:

$$0.01<T1/T2<0.06 \quad (7)$$

where

T1: a distance along the optical axis from an image-side surface of the first lens to an object-side surface of the second lens, and T2: a distance along the optical axis from an image-side surface of the second lens to an object-side surface of the third lens, and The conditional expression (7) defines an appropriate range of a relationship between the distance along the optical axis from the image-side surface of the first lens to the object-side surface of the second lens and the distance along the optical axis from the image-side surface of the second lens to the object-side surface of the third lens. By satisfying the conditional expression (7), the second lens is ranged at an optimum position, and aberration correction function of the lens becomes more effective. As a result, reduction in the profile can be achieved and the astigmatism and the distortion can be properly corrected.

According to the imaging lens having the above-described configuration, it is preferable that the following conditional expression (8) is satisfied:

$$0.40<f3/f<1.75 \quad (8)$$

where f3: a focal length of the third lens, and f: a focal length of the overall optical system of the imaging lens.

The conditional expression (8) defines an appropriate range of the refractive power of the third lens. When a value is below the upper limit of the conditional expression (8), positive refractive power of the third lens becomes appropriate and reduction in the profile can be achieved. On the other hand, when the value is above the lower limit of the conditional expression (8), the spherical aberration, the field curvature and the distortion can be properly corrected.

According to the imaging lens having the above-described configuration, it is preferable that the following conditional expression (9) is satisfied:

$$-1.65<f4/f<-0.50 \quad (9)$$

where f4: a focal length of the fourth lens, and f: a focal length of the overall optical system of the imaging lens.

The conditional expression (9) defines an appropriate range of the refractive power of the fourth lens. When a value is below the upper limit of the conditional expression (9), negative refractive power of the fourth lens becomes appropriate and it is favorable for reduction in the profile. On the other hand, when the value is above the lower limit of the conditional expression (9), the astigmatism, the distortion and the chromatic aberration can be properly corrected.

According to the imaging lens having the above-described configuration, it is preferable that the following conditional expression (10) is satisfied:

$$0.50<f5/f<3.00 \quad (10)$$

where f5: a focal length of the fifth lens, and f: a focal length of the overall optical system of the imaging lens.

The conditional expression (10) defines an appropriate range of the refractive power of the fifth lens. When a value is below the upper limit of the conditional expression (10), positive refractive power of the fifth lens becomes appropriate and reduction in the profile can be achieved. On the other hand, when the value is above the lower limit of the conditional expression (10), the spherical aberration, the astigmatism and the distortion can be properly corrected.

According to the imaging lens having the above-described configuration, it is preferable that the following conditional expression (11) is satisfied:

$$-1.40<f5/f7<-0.30 \quad (11)$$

where f5: a focal length of the fifth lens, and f7: a focal length of the seventh lens.

The conditional expression (11) defines an appropriate range of a relationship between the focal length of the fifth lens and the focal length of the seventh lens. By satisfying the conditional expression (11), refractive powers of the fifth lens and the seventh lens can be appropriately balanced. As a result, reduction in the profile can be achieved. Furthermore, by satisfying the conditional expression (11), the chromatic aberration, the astigmatism, the field curvature and the distortion can be properly corrected.

According to the imaging lens having the above-described configuration, it is preferable that the following conditional expression (12) is satisfied:

$$-6.50<r1/f<0.50 \quad (12)$$

where r1: a paraxial curvature radius of an object-side surface of the first lens, and f: a focal length of the overall optical system of the imaging lens.

The conditional expression (12) defines an appropriate range of the paraxial curvature radius of the object-side surface of the first lens. By satisfying the conditional expression (12), the astigmatism can be properly corrected.

According to the imaging lens having the above-described configuration, it is preferable that the following conditional expression (13) is satisfied:

$$-2.00<r2/f<-0.40 \quad (13)$$

where r2: a paraxial curvature radius of an image-side surface of the first lens, and f: a focal length of the overall optical system of the imaging lens.

The conditional expression (13) defines an appropriate range of the paraxial curvature radius of the image-side surface of the first lens. By satisfying the conditional expression (13), the astigmatism and the distortion can be properly corrected.

According to the imaging lens having the above-described configuration, it is preferable that the following conditional expression (14) is satisfied:

$$0.10 < r11/f < 0.65 \quad (14)$$

where r11: a paraxial curvature radius of an object-side surface of the sixth lens, and f: a focal length of the overall optical system of the imaging lens.

The conditional expression (14) defines an appropriate range of the paraxial curvature radius of the object-side surface of the sixth lens. By satisfying the conditional expression (14), the coma aberration, the astigmatism, the field curvature and the distortion can be properly corrected.

According to the imaging lens having the above-described configuration, it is preferable that the following conditional expression (15) is satisfied:

$$0.10 < r12/f < 0.65 \quad (15)$$

where r12: a paraxial curvature radius of an image-side surface of the sixth lens, and f: a focal length of the overall optical system of the imaging lens.

The conditional expression (15) defines an appropriate range of the paraxial curvature radius of the image-side surface of the sixth lens. By satisfying the conditional expression (15), the coma aberration, the astigmatism, the field curvature and the distortion can be properly corrected.

According to the imaging lens having the above-described configuration, it is preferable that the following conditional expression (16) is satisfied:

$$3.50 < r13/f \quad (16)$$

where r13: a paraxial curvature radius of an object-side surface of the seventh lens, and f: a focal length of the overall optical system of the imaging lens.

The conditional expression (16) defines an appropriate range of the paraxial curvature radius of the object-side surface of the seventh lens. By satisfying the conditional expression (16), the astigmatism and the distortion can be properly corrected.

Effect of Invention

According to the present invention, there can be provided an imaging lens with high resolution which satisfies demand of the wide field of view, the low profile and the low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7 and 9 are schematic views of the imaging lenses in Examples 1 to 5 according to the embodiments of the present invention, respectively.

The imaging lens according to the present embodiment comprises, in order from an object side to an image side, a first lens L1 with positive or negative refractive power in a paraxial region, a second lens L2 with positive or negative refractive power in a paraxial region, a third lens L3 with positive refractive power in a paraxial region, a fourth lens L4 with negative refractive power in a paraxial region, a fifth lens L5 with positive refractive power in a paraxial region, a sixth lens L6 with positive refractive power in a paraxial region, and a seventh lens L7 with negative refractive power.

A filter IR such as an IR cut filter and a cover glass are arranged between the seventh lens L7 and an image plane IMG (namely, the image plane of an image sensor). The filter IR is omissible.

An aperture stop ST is arranged between the second lens L2 and the third lens L3, and symmetry is created with the aperture stop ST. As a result, the distortion which may be increased due to the wide field of view can be suppressed.

The first lens L1 has the positive refractive power and has a meniscus shape having an object-side surface being concave and an image-side surface being convex in the paraxial region. Therefore, the astigmatism and the distortion are properly corrected.

Figure 9:
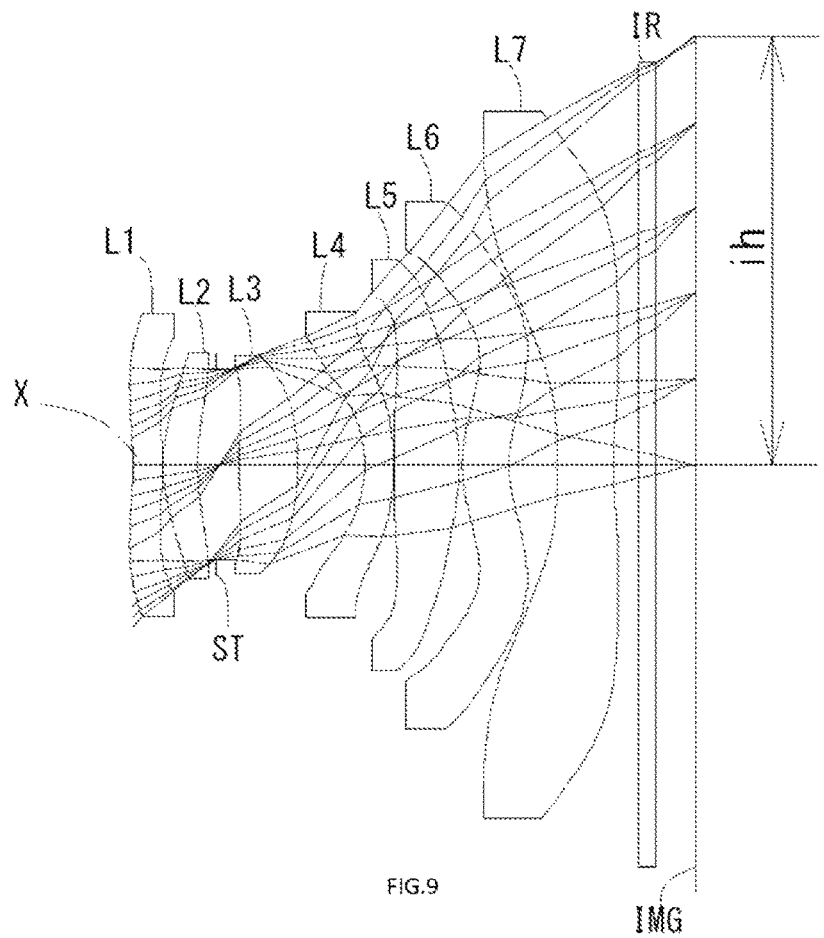
FIG. 9 is a schematic view showing an imaging lens in Example 5 according to the present invention.

The refractive power of the first lens L1 may be negative as in the Example 5 shown in FIG. 9. This case is favorable for correction of the chromatic aberration.

The second lens L2 has the negative refractive power and has a meniscus shape having an object-side surface being convex and an image-side surface being concave in the paraxial region. Therefore, the coma aberration, the astigmatism, the field curvature and the distortion are properly corrected.

The refractive power of the second lens L2 may be positive as in the Example 5 shown in FIG. 9. This case is favorable for reduction in the profile.

The third lens L3 has the positive refractive power and has a biconvex shape having convex surfaces facing the object side and the image side in the paraxial region. Therefore, reduction in the profile is achieved and the spherical aberration, the field curvature and the distortion are properly corrected by the positive refractive power on both sides.

The fourth lens L4 has the negative refractive power and has a meniscus shape having an object-side surface being concave and an image-side surface being convex in the paraxial region. Therefore, the astigmatism, the distortion and the chromatic aberration are properly corrected.

The fifth lens L5 has the positive refractive power and has a meniscus shape having an object-side surface being concave and an image-side surface being convex in the paraxial region. Therefore, reduction in the profile is achieved and the astigmatism and the distortion are properly corrected.

The sixth lens L6 has the positive refractive power and has a meniscus shape having an object-side surface being convex and an image-side surface being concave in the paraxial region. Therefore, reduction in the profile is achieved and the coma aberration, the astigmatism, the field curvature and the distortion are properly corrected.

The image-side surface of the sixth lens L6 is formed as an aspheric surface having at least one pole point in a position off an optical axis X. Therefore, the astigmatism, the field curvature and the distortion are properly corrected.

The seventh lens L7 has the negative refractive power and has a meniscus shape having an object-side surface being convex and an image-side surface being concave in the paraxial region. Therefore, the chromatic aberration, the astigmatism, the field curvature and the distortion are properly corrected.

The object-side surface of the seventh lens L7 is formed as an aspheric surface having at least one pole point in a position off the optical axis X. Therefore, the astigmatism, the field curvature and the distortion are properly corrected.

Regarding the imaging lens according to the present embodiments, it is preferable that all lenses of the first lens L1 to the seventh lens L7 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (16).

$$0.10 < (T1/TTL) \times 100 < 0.45 \tag{1}$$

$$10.00 < T2/T4 \tag{2}$$

$$13.00 < vd6 < 25.50 \tag{3}$$

$$0.10 < vd6/vd7 < 0.60 \tag{4}$$

$$0.20 < (D1/|f1|) \times 100 < 7.50 \tag{5}$$

$$0.10 < (T4/TTL) \times 100 < 0.40 \tag{6}$$

$$0.01 < T1/T2 < 0.06 \tag{7}$$

$$0.40 < f3/f < 1.75 \tag{8}$$

$$-1.65 < f4/f < -0.50 \tag{9}$$

$$0.50 < f5/f < 3.00 \tag{10}$$

$$-1.40 < f5/f7 < -0.30 \tag{11}$$

$$-6.50 < r1/f < -0.50 \tag{12}$$

$$-2.00 < r2/f < -0.40 \tag{13}$$

$$0.10 < r11/f < 0.65 \tag{14}$$

$$0.10 < r12/f < 0.65 \tag{15}$$

$$3.50 < r13/f \tag{16}$$

where
vd6: an abbe number at d-ray of the sixth lens L6,
vd7: an abbe number at d-ray of the seventh lens L7,
D1: a thickness of the first lens L1 along the optical axis X,
T1: a distance along the optical axis X from an image-side surface of the first lens L1 to an object-side surface of the second lens L2,
T2: a distance along the optical axis X from an image-side surface of the second lens L2 to an object-side surface of the third lens L3,
T4: a distance along the optical axis X from an image-side surface of the fourth lens L4 to an object-side side surface of the fifth lens L5,
f: a focal length of the overall optical system of the imaging lens,
TTL: a total track length,
f1: a focal length of the first lens L1,
f3: a focal length of the third lens L3,
f4: a focal length of the fourth lens L4,
f5: a focal length of the fifth lens L5,
f7: a focal length of the seventh lens L7,
r1: a paraxial curvature radius of an object-side surface of the first lens L1,
r2: a paraxial curvature radius of an image-side surface of the first lens L1,
r11: a paraxial curvature radius of an object-side surface of the sixth lens L6,
r12: a paraxial curvature radius of an image-side surface of the sixth lens L6, and
r13: a paraxial curvature radius of an object-side surface of the seventh lens L7.

It is not necessary to satisfy the above all conditional expressions, and by satisfying the conditional expression individually, operational advantage corresponding to each conditional expression can be obtained.

The imaging lens according to the present embodiments shows further preferable effect by satisfying the following conditional expressions (1a) to (16a).

$$0.15 < (T1/TTL) \times 100 < 0.35 \tag{1a}$$

$$20.00 < T2/T4 < 60.00 \tag{2a}$$

$$16.00 < vd6 < 22.50 \tag{3a}$$

$$0.20 < vd6/vd7 < 0.45 \tag{4a}$$

$$0.35 < (D1/|f1|) \times 100 < 6.50 \tag{5a}$$

$$0.15 < (T4/TTL) \times 100 < 0.30 \tag{6a}$$

$0.02 < T1/T2 < 0.04$ (7a)

$0.70 < f3/f < 1.40$ (8a)

$-1.30 < f4/f < -0.70$ (9a)

$0.90 < f5/f < 2.40$ (10a)

$-1.15 < f5/f5/f7 < -0.45$ (11a)

$-5.50 < r1/f < -0.85$ (12a)

$-1.65 < r2/f < -0.75$ (13a)

$0.25 < r11/f < 0.55$ (14a)

$0.25 < r12/f < 0.55$ (15a)

$5.50 < r13/f < 35.00$ (16a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$ [Equation 1]

Next, examples of the imaging lens according to this embodiment will be explained. In each example, f denotes the focal length of the overall optical system of the imaging lens, Fno denotes a F-number, ω denotes a half field of view, ih denotes a maximum image height, and TTL denotes a total track length. Additionally, i denotes surface number counted from the object side, r denotes the paraxial curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

EXAMPLE 1

The basic lens data is shown below in Table 1.

TABLE 1

| Example 1 |
|---|

| Unit mm | | | | |
|---|---|---|---|---|
| f = 4.40 | | | | |
| Fno = 1.80 | | | | |
| ω(°) = 50.0 | | | | |
| ih = 5.20 | | | | |
| TTL = 6.81 | | | | |

| Surface Data | | | | |
|---|---|---|---|---|
| i | r | d | Nd | vd |
| (Object) | Infinity | Infinity | | |
| 1* | −18.31833 | 0.5363 | 1.544 | 56.44 (vd1) |
| 2* | −4.3200 | 0.0150 | | |
| 3* | 2.0327 | 0.2543 | 1.671 | 19.24 (vd2) |
| 4* | 1.6764 | 0.3186 | | |
| 5 (Stop) | Infinity | 0.2399 | | |
| 6* | 8.1488 | 0.7530 | 1.535 | 55.69 (vd3) |
| 7* | −3.0253 | 0.7547 | | |
| 8* | −1.7732 | 0.3500 | 1.671 | 19.24 (vd4) |
| 9* | −5.6805 | 0.0150 | | |
| 10* | −11.4884 | 0.6916 | 1.544 | 56.44 (vd5) |
| 11* | −2.6165 | 0.0779 | | |
| 12* | 1.8561 | 0.6683 | 1.671 | 19.24 (vd6) |
| 13* | 1.8256 | 0.5323 | | |
| 14* | 67.2594 | 0.7000 | 1.535 | 55.69 (vd7) |
| 15* | 4.3517 | 0.3000 | | |
| 18 | Infinity | 0.2100 | 1.517 | 64.20 |
| 19 | Infinity | 0.4683 | | |
| Image Plane | Infinity | | | |

| Constituent Lens Data | | |
|---|---|---|
| Lens | Start Surface | Focal Length |
| 1 | 1 | 10.275 |
| 2 | 3 | −19.987 |
| 3 | 6 | 4.224 |
| 4 | 8 | −3.987 |

TABLE 1-continued

| | | Example 1 | | | |
|---|---|---|---|---|---|
| 5 | 10 | 6.057 | | | |
| 6 | 12 | 21.241 | | | |
| 7 | 14 | -8.734 | | | |

Aspheric Surface Data

| | First Surface | Second Surface | Third Surface | Fourth Surface | Sixth Surface |
|---|---|---|---|---|---|
| k   | 0.000000E+00  | 0.000000E+00  | 0.000000E+00  | 0.000000E+00  | 0.000000E+00 |
| A4  | 4.352318E-02  | 1.400658E-01  | -1.016769E-01 | -2.459534E-01 | -1.012073E-02 |
| A6  | -2.570791E-02 | -1.587644E-01 | 4.207642E-02  | 3.400388E-01  | -2.531432E-02 |
| A8  | 2.270658E-02  | 1.993450E-01  | -2.969465E-02 | -6.717588E-01 | 4.584522E-02 |
| A10 | -1.360302E-02 | -1.885454E-01 | -1.133162E-02 | 1.024063E+00  | -1.055811E-01 |
| A12 | 5.111489E-03  | 1.217470E-01  | 1.463979E-02  | -1.122043E+00 | 1.413100E-01 |
| A14 | -1.128390E-03 | -5.154930E-02 | -2.965915E-03 | 7.920591E-01  | -1.118800E-01 |
| A16 | 1.292338E-04  | 1.357270E-02  | 0.000000E+00  | -3.150130E-01 | 4.685000E-02 |
| A18 | -5.693576E-06 | -2.009014E-03 | 0.000000E+00  | 5.402590E-02  | -7.500000E-03 |
| A20 | 0.000000E+00  | 1.278137E-04  | 0.000000E+00  | 0.000000E+00  | 0.000000E+00 |

| | Seventh Surface | Eighth Surface | Ninth Surface | Tenth Surface | Eleventh Surface |
|---|---|---|---|---|---|
| k   | 9.000717E-01  | 0.000000E+00  | 0.000000E+00  | 0.000000E+00  | 0.000000E+00 |
| A4  | -1.484676E-02 | -2.450785E-01 | -2.104027E-01 | 2.086563E-01  | 1.297117E-01 |
| A6  | -8.476290E-02 | 5.758108E-01  | 3.228007E-01  | -3.031397E-01 | -6.758516E-02 |
| A8  | 1.983986E-01  | -8.833610E-01 | -4.406933E-01 | 2.889087E-01  | 3.617232E-02 |
| A10 | -2.850534E-01 | 9.367597E-01  | 3.992593E-01  | -2.027089E-01 | -2.326443E-02 |
| A12 | 2.278253E-01  | -6.343156E-01 | -2.236503E-01 | 1.008357E-01  | 1.089174E-02 |
| A14 | -9.594362E-02 | 2.740607E-01  | 7.897667E-02  | -3.392703E-02 | -3.001693E-03 |
| A16 | 1.664060E-02  | -7.336141E-02 | -1.732064E-02 | 7.285051E-03  | 4.708479E-04 |
| A18 | 0.000000E+00  | 1.109234E-02  | 2.170105E-03  | -8.993428E-04 | -3.931747E-05 |
| A20 | 0.000000E+00  | -7.226242E-04 | -1.192368E-04 | 4.841597E-05  | 1.365111E-06 |

| | Twelfth Surface | Thirteenth Surface | Fourteenth Surface | Fifteenth Surface |
|---|---|---|---|---|
| k   | -1.207492E+01 | -1.270920E+01 | 0.000000E+00  | 0.000000E+00 |
| A4  | 2.007272E-02  | -3.414990E-02 | -1.669531E-01 | -9.565677E-02 |
| A6  | -6.728555E-02 | 5.173859E-03  | 8.933056E-02  | 3.723726E-02 |
| A8  | 5.267599E-02  | -3.726498E-03 | -2.674713E-02 | -8.530022E-03 |
| A10 | -2.002420E-02 | 1.385240E-03  | 4.938204E-03  | 1.207961E-03 |
| A12 | 1.055083E-02  | -2.632963E-04 | -5.781292E-04 | -1.111231E-04 |
| A14 | -2.278530E-03 | 3.036890E-05  | 4.308748E-05  | 6.653120E-06 |
| A16 | 2.934971E-04  | -2.236793E-06 | -1.984476E-06 | -2.501938E-07 |
| A18 | -2.098575E-05 | 9.816897E-08  | 5.155942E-08  | 5.381537E-09 |
| A20 | 6.452233E-07  | -1.950232E-09 | -5.784404E-10 | -5.085610E-11 |

The imaging lens in Example 1 satisfies conditional expressions (1) to (16) as shown in Table 6.

Figure 1:
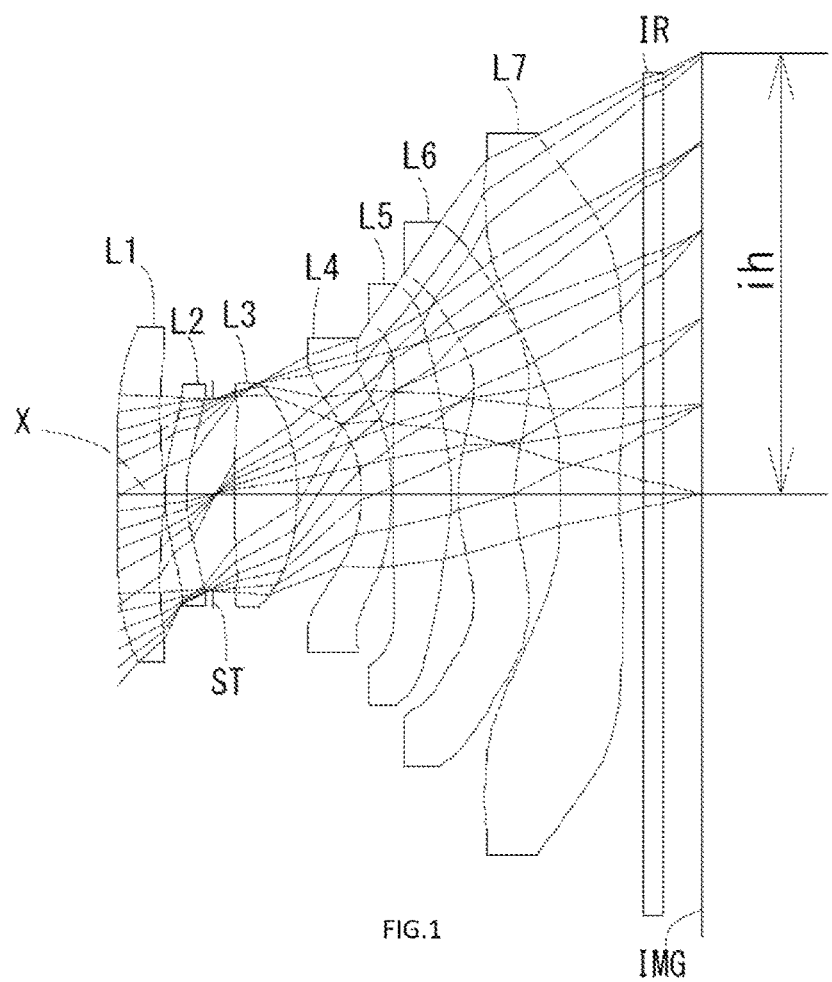
FIG. 1 is a schematic view showing an imaging lens in Example 1 according to the present invention.
Figure 2:
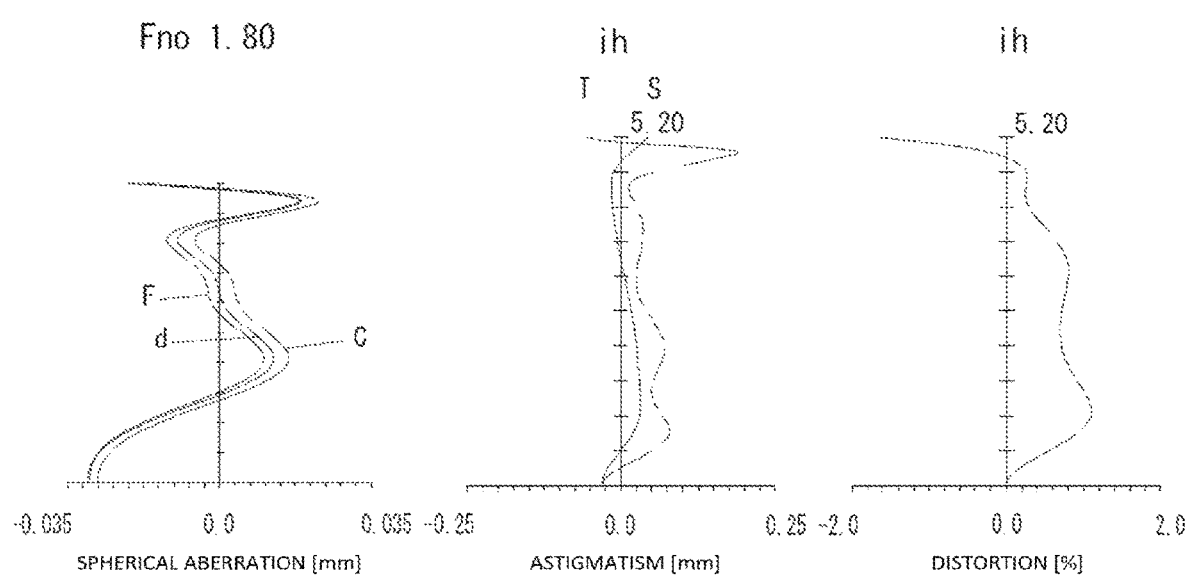
FIG. 2 shows spherical aberration, astigmatism, and distortion of the imaging lens in Example 1 according to the present invention.
Figure 3:
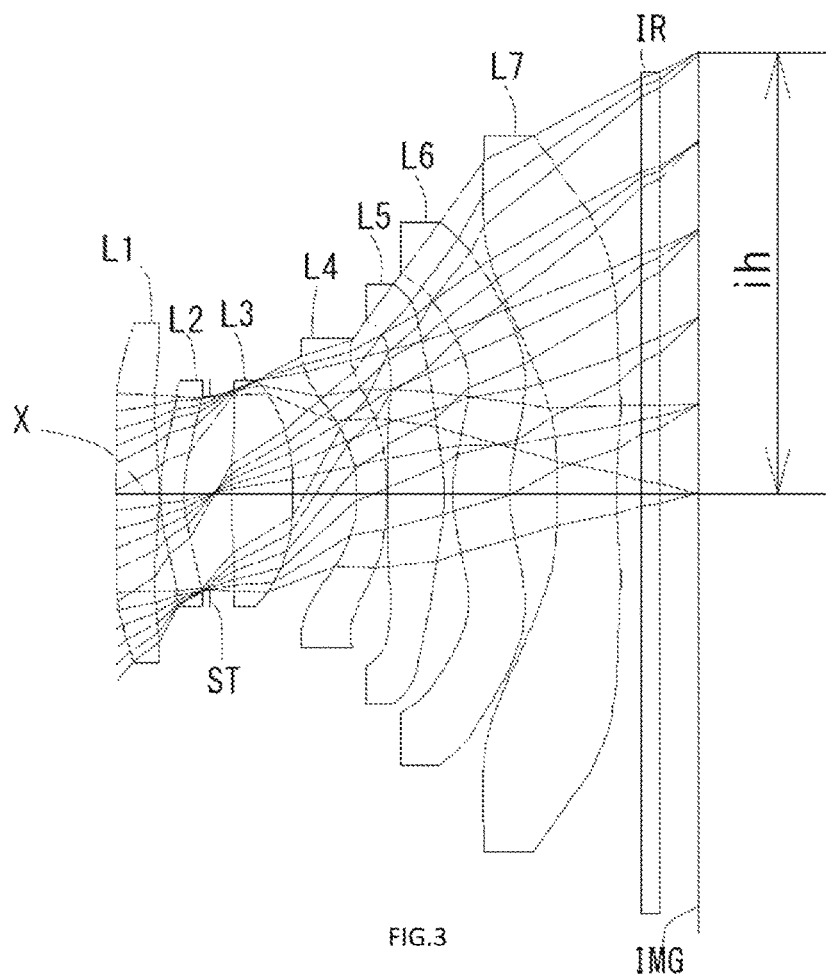
FIG. 3 is a schematic view showing an imaging lens in Example 2 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8 and 10). As shown in FIG. 2, each aberration is corrected excellently.

EXAMPLE 2

The basic lens data is shown below in Table 2.

TABLE 2

| | Example 2 | | | | |
|---|---|---|---|---|---|
| | Unit mm | | | | | f = 4.41
Fno = 1.80
ω(°) = 50.0
ih = 5.20
TTL = 6.81

| | Surface Data | | | | |
|---|---|---|---|---|---|
| i | r | d | Nd | vd | |
| (Object) | Infinity | Infinity | | | |
| 1* | -12.74477 | 0.5015 | 1.544 | 56.44 (vd1) | |
| 2* | -4.3246 | 0.0150 | | | |
| 3* | 2.1593 | 0.2813 | 1.671 | 19.24 (vd2) | |

TABLE 2-continued

| | Example 2 | | | |
|---|---|---|---|---|
| 4* | 1.8116 | 0.3074 | | |
| 5 (Stop) | Infinity | 0.2442 | | |
| 6* | 7.4741 | 0.7412 | 1.535 | 55.69 (vd3) |
| 7* | −3.2203 | 0.7507 | | |
| 8* | −1.7795 | 0.3500 | 1.671 | 19.24 (vd4) |
| 9* | −5.0587 | 0.0150 | | |
| 10* | −9.7959 | 0.6622 | 1.544 | 56.44 (vd5) |
| 11* | −2.7143 | 0.1024 | | |
| 12* | 1.7978 | 0.6743 | 1.671 | 19.24 (vd6) |
| 13* | 1.7958 | 0.5613 | | |
| 14* | 73.2503 | 0.7000 | 1.535 | 55.69 (vd7) |
| 15* | 4.3238 | 0.3000 | | |
| 18 | Infinity | 0.2100 | 1.517 | 64.20 |
| 19 | Infinity | 0.4656 | | |
| Image Plane | Infinity | | | |

Constituent Lens Data

| Lens | Start Surface | Focal Length |
|---|---|---|
| 1 | 1 | 11.775 |
| 2 | 3 | −24.840 |
| 3 | 6 | 4.312 |
| 4 | 8 | −4.276 |
| 5 | 10 | 6.676 |
| 6 | 12 | 17.910 |
| 7 | 14 | −8.622 |

Aspheric Surface Data

| | First Surface | Second Surface | Third Surface | Fourth Surface | Sixth Surface |
|---|---|---|---|---|---|
| k | 0.000000E+00 | 0.000000E+00 | 0.000000E+00 | 0.000000E+00 | 0.000000E+00 |
| A4 | 4.822204E−02 | 1.238152E−01 | −9.246000E−02 | −2.138569E−01 | −4.597134E−03 |
| A6 | −3.047816E−02 | −1.242797E−01 | 3.785001E−02 | 2.906004E−01 | −4.604110E−02 |
| A8 | 2.806135E−02 | 1.511784E−01 | −2.447287E−02 | −5.812192E−01 | 1.045818E−01 |
| A10 | −1.774890E−02 | −1.417169E−01 | −8.751071E−03 | 9.063400E−01 | −2.001016E−01 |
| A12 | 7.075938E−03 | 9.049165E−02 | 1.092771E−02 | −9.938439E−01 | 2.319291E−01 |
| A14 | −1.683214E−03 | −3.770518E−02 | −2.111448E−03 | 6.899794E−01 | −1.619545E−01 |
| A16 | 2.144430E−04 | 9.718197E−03 | 0.000000E+00 | −2.672481E−01 | 6.111053E−02 |
| A18 | −1.114180E−05 | −1.400959E−03 | 0.000000E+00 | 4.437563E−02 | −9.166654E−03 |
| A20 | 0.000000E+00 | 8.642418E−05 | 0.000000E+00 | 0.000000E+00 | 0.000000E+00 |

| | Seventh Surface | Eighth Surface | Ninth Surface | Tenth Surface | Eleventh Surface |
|---|---|---|---|---|---|
| k | 1.123803E+00 | 0.000000E+00 | 0.000000E+00 | 0.000000E+00 | 0.000000E+00 |
| A4 | −1.459368E−02 | −2.487210E−01 | −1.964190E−01 | 2.233087E−01 | 9.595804E−02 |
| A6 | −8.007266E−02 | 5.870906E−01 | 3.265758E−01 | −3.004585E−01 | −1.260447E−02 |
| A8 | 1.791244E−01 | −9.195702E−01 | −4.849883E−01 | 2.628373E−01 | −1.135636E−02 |
| A10 | −2.509250E−01 | 9.830679E−01 | 4.597789E−01 | −1.710114E−01 | 9.863176E−04 |
| A12 | 1.955692E−01 | −6.687810E−01 | −2.667196E−01 | 8.039827E−02 | 3.272355E−03 |
| A14 | −8.034718E−02 | 2.912141E−01 | 9.759917E−02 | −2.589738E−02 | −1.501589E−03 |
| A16 | 1.357131E−02 | −7.904081E−02 | −2.223709E−02 | 5.361293E−03 | 2.884396E−04 |
| A18 | 0.000000E+00 | 1.220902E−02 | 2.899090E−03 | −6.409280E−04 | −2.662980E−05 |
| A20 | 0.000000E+00 | −8.194976E−04 | −1.657501E−04 | 3.351100E−05 | 9.737072E−07 |

| | Twelfth Surface | Thirteenth Surface | Fourteenth Surface | Fifteenth Surface |
|---|---|---|---|---|
| k | −1.249258E+01 | −1.203034E+01 | 0.000000E+00 | 0.000000E+00 |
| A4 | 2.015835E−02 | −3.041018E−02 | −1.667037E−01 | −1.026345E−01 |
| A6 | −6.718249E−02 | 1.172580E−03 | 8.932001E−02 | 4.066956E−02 |
| A8 | 5.351071E−02 | −1.225331E−03 | −2.674738E−02 | −9.501114E−03 |
| A10 | −3.100505E−02 | 5.205389E−04 | 4.938191E−03 | 1.382461E−03 |
| A12 | 1.155688E−02 | −7.275631E−05 | −5.781293E−04 | −1.314158E−04 |
| A14 | −2.642700E−03 | 2.310448E−06 | 4.308751E−05 | 8.168719E−06 |
| A16 | 3.626125E−04 | 4.116208E−07 | −1.984479E−06 | −3.202712E−07 |
| A18 | −2.761952E−05 | −4.446417E−08 | 5.155971E−08 | 7.207500E−09 |
| A20 | 9.000774E−07 | 1.344553E−09 | −5.784314E−10 | −7.138470E−11 |

The imaging lens in Example 2 satisfies conditional expressions (1) to (16) as shown in Table 6.

Figure 4:
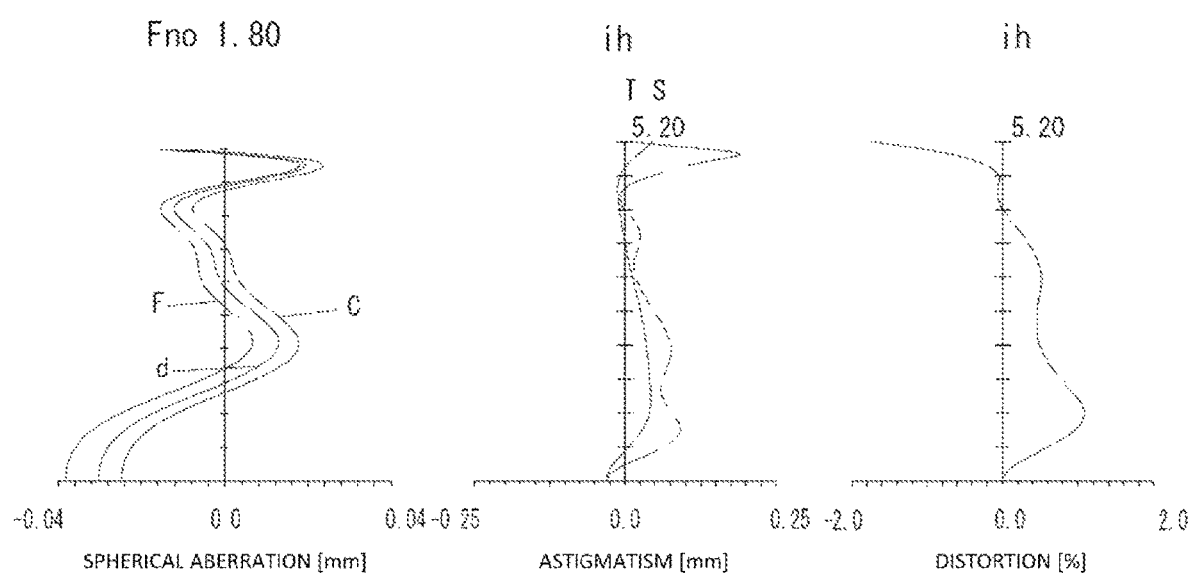
FIG. 4 shows spherical aberration, astigmatism, and distortion of the imaging lens in Example 2 according to the present invention.
Figure 5:
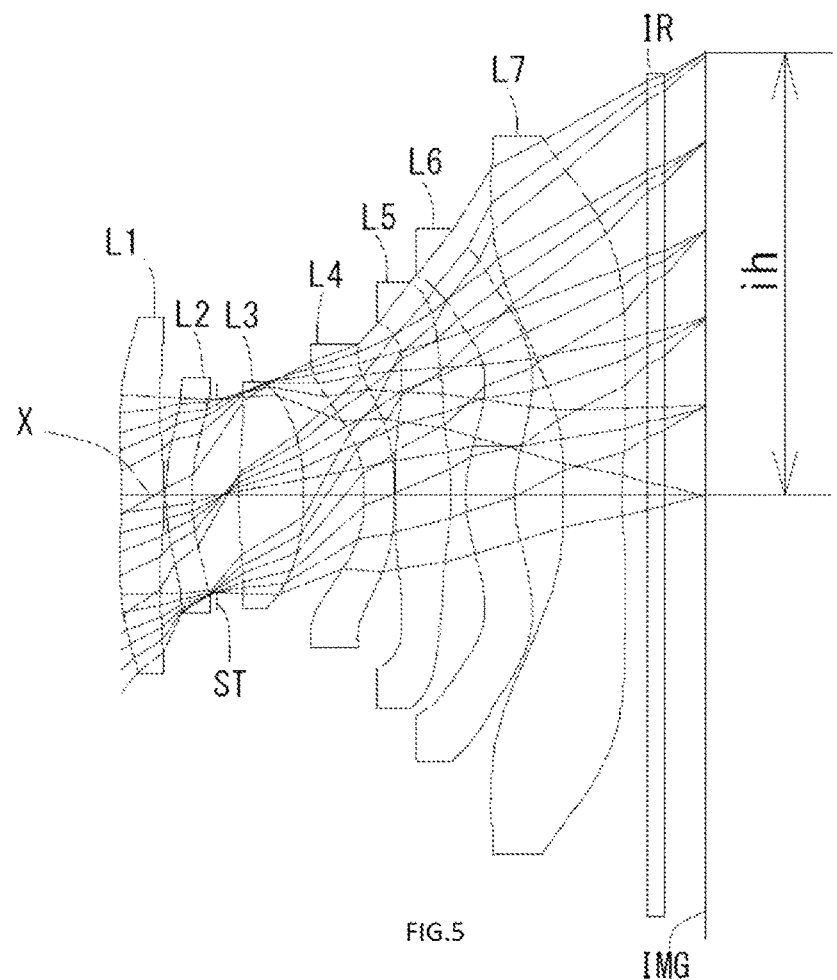
FIG. 5 is a schematic view showing an imaging lens in Example 3 according to the present invention.

FIG. 4 shows spherical aberration (mm), astigmatism (mm), and distortion (%) of the imaging lens in Example 2. As shown in FIG. 4, each aberration is corrected excellently.

EXAMPLE 3

The basic lens data is shown below in Table 3.

TABLE 3

Example 3

Unit mm $f = 4.40$
$Fno = 1.80$
$\omega(°) = 50.3$
$ih = 5.20$
$TTL = 6.81$

Surface Data

| i | r | d | Nd | vd |
|---|---|---|---|---|
| (Object) | Infinity | Infinity | | |
| 1* | −12.96325 | 0.5075 | 1.544 | 56.44 (vd1) |
| 2* | −4.4257 | 0.0150 | | |
| 3* | 2.3397 | 0.3079 | 1.671 | 19.24 (vd2) |
| 4* | 1.9283 | 0.2889 | | |
| 5 (Stop) | Infinity | 0.2600 | | |
| 6* | 7.0615 | 0.7678 | 1.535 | 55.69 (vd3) |
| 7* | −3.1896 | 0.7176 | | |
| 8* | −1.7928 | 0.3501 | 1.671 | 19.24 (vd4) |
| 9* | −4.8142 | 0.0150 | | |
| 10* | −17.8554 | 0.6468 | 1.544 | 56.44 (vd5) |
| 11* | −3.1430 | 0.1772 | | |
| 12* | 1.6163 | 0.5695 | 1.671 | 19.24 (vd6) |
| 13* | 1.5840 | 0.5707 | | |
| 14* | 60.4935 | 0.7000 | 1.535 | 55.69 (vd7) |
| 15* | 4.3189 | 0.3000 | | |
| 18 | Infinity | 0.2100 | 1.517 | 64.20 |
| 19 | Infinity | 0.4682 | | |
| Image Plane | Infinity | | | |

Constituent Lens Data

| Lens | Start Surface | Focal Length |
|---|---|---|
| 1 | 1 | 12.089 |
| 2 | 3 | −23.380 |
| 3 | 6 | 4.218 |
| 4 | 8 | −4.466 |
| 5 | 10 | 6.899 |
| 6 | 12 | 19.436 |
| 7 | 14 | −8.734 |

Aspheric Surface Data

| | First Surface | Second Surface | Third Surface | Fourth Surface | Sixth Surface |
|---|---|---|---|---|---|
| k | 0.000000E+00 | 0.000000E+00 | 0.000000E+00 | 0.000000E+00 | 0.000000E+00 |
| A4 | 4.524570E−02 | 1.232449E−01 | −6.563795E−02 | −1.788268E−01 | −6.306931E−03 |
| A6 | −2.477181E−02 | −1.260414E−01 | −3.235814E−03 | 1.888867E−01 | −2.978411E−02 |
| A8 | 1.961904E−02 | 1.411829E−01 | 1.729026E−02 | −2.714651E−01 | 4.484594E−02 |
| A10 | −1.092245E−02 | −1.191134E−01 | −2.986169E−02 | 2.699365E−01 | −7.505540E−02 |
| A12 | 3.863679E−03 | 6.887520E−02 | 1.619045E−02 | −1.741839E−01 | 7.983201E−02 |
| A14 | −8.106996E−04 | −2.635316E−02 | −2.687343E−03 | 6.438229E−02 | −5.613797E−02 |
| A16 | 8.793756E−05 | 6.313591E−03 | 0.000000E+00 | −9.174040E−03 | 2.200093E−02 |
| A18 | −3.605753E−06 | −8.528650E−04 | 0.000000E+00 | 0.000000E+00 | −3.311400E−03 |
| A20 | 0.000000E+00 | 4.951942E−05 | 0.000000E+00 | 0.000000E+00 | 0.000000E+00 |

| | Seventh Surface | Eighth Surface | Ninth Surface | Tenth Surface | Eleventh Surface |
|---|---|---|---|---|---|
| k | 1.160080E+00 | 0.000000E+00 | 0.000000E+00 | 0.000000E+00 | 0.000000E+00 |
| A4 | −1.940203E−02 | −2.447296E−01 | −1.907674E−01 | 1.990556E−01 | 8.264007E−02 |
| A6 | −5.573360E−02 | 5.765549E−01 | 3.298917E−01 | −2.298531E−01 | 3.069952E−02 |
| A8 | 1.219389E−01 | −8.833727E−01 | −4.810124E−01 | 1.707564E−01 | −6.067394E−02 |
| A10 | −1.720386E−01 | 9.117280E−01 | 4.369755E−01 | −9.939413E−02 | 3.359879E−02 |
| A12 | 1.327834E−01 | −5.962258E−01 | −2.408871E−01 | 4.469144E−02 | −1.027226E−02 |
| A14 | −5.371068E−02 | 2.488271E−01 | 8.308700E−02 | −1.450079E−02 | 1.967455E−03 |
| A16 | 8.885905E−03 | −6.439588E−02 | −1.768828E−02 | 3.114872E−03 | −2.398809E−04 |

TABLE 3-continued

| | | Example 3 | | | |
|---|---|---|---|---|---|
| A18 | 0.000000E+00 | 9.402568E−03 | 2.138053E−03 | −3.920862E−04 | 1.719869E−05 |
| A20 | 0.000000E+00 | −5.890989E−04 | −1.127000E−04 | 2.167066E−05 | −5.521979E−07 |
| | | Twelfth Surface | Thirteenth Surface | Fourteenth Surface | Fifteenth Surface |
| | k | −1.029164E+01 | −1.016349E+01 | 0.000000E+00 | 0.000000E+00 |
| | A4 | 1.425841E−02 | −2.434390E−02 | −1.657659E−01 | −9.971469E−02 |
| | A6 | −4.179367E−02 | −2.718155E−03 | 8.927413E−02 | 3.949802E−02 |
| | A8 | 2.296710E−02 | −5.721783E−04 | −2.675007E−02 | −9.147045E−03 |
| | A10 | −1.052842E−02 | 5.451369E−04 | 4.938124E−03 | 1.308910E−03 |
| | A12 | 3.178948E−03 | −1.214556E−04 | −5.781267E−04 | −1.218540E−04 |
| | A14 | −5.772426E−04 | 1.547402E−05 | 4.308800E−05 | 7.405286E−06 |
| | A16 | 6.518515E−05 | −1.199657E−06 | −1.984441E−06 | −2.838135E−07 |
| | A18 | −4.574740E−06 | 4.700516E−08 | 5.156073E−08 | 6.249697E−09 |
| | A20 | 1.567767E−07 | −5.612048E−10 | −5.786064E−10 | −6.071220E−11 |

The imaging lens in Example 3 satisfies conditional expressions (1) to (16) as shown in Table 6.

Figure 6:
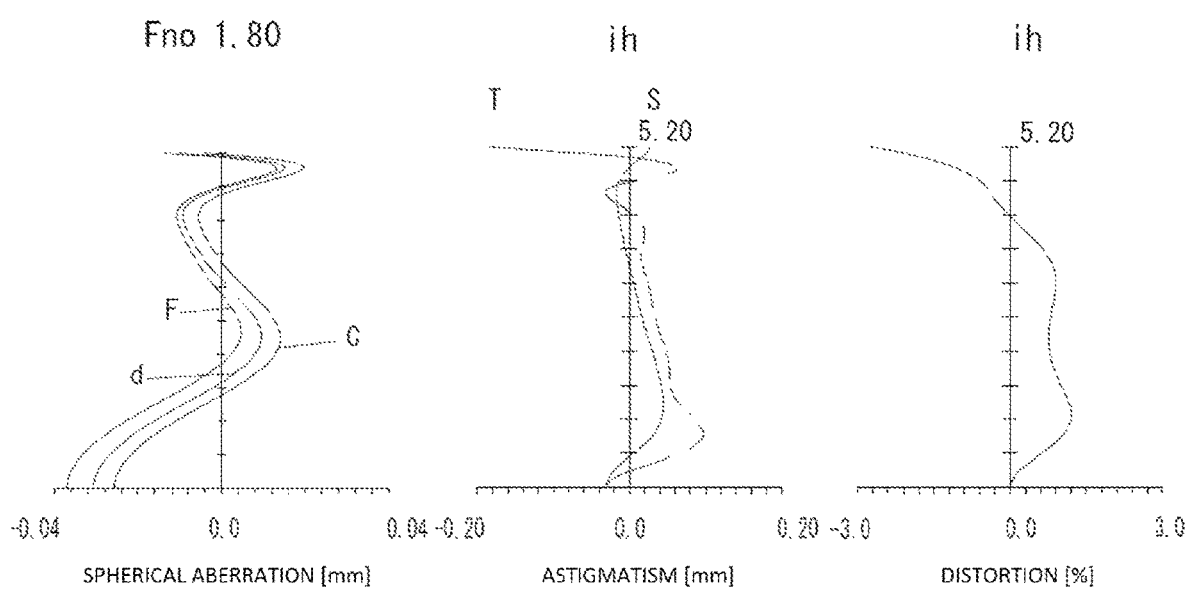
FIG. 6 shows spherical aberration, astigmatism, and distortion of the imaging lens in Example 3 according to the present invention.
Figure 7:
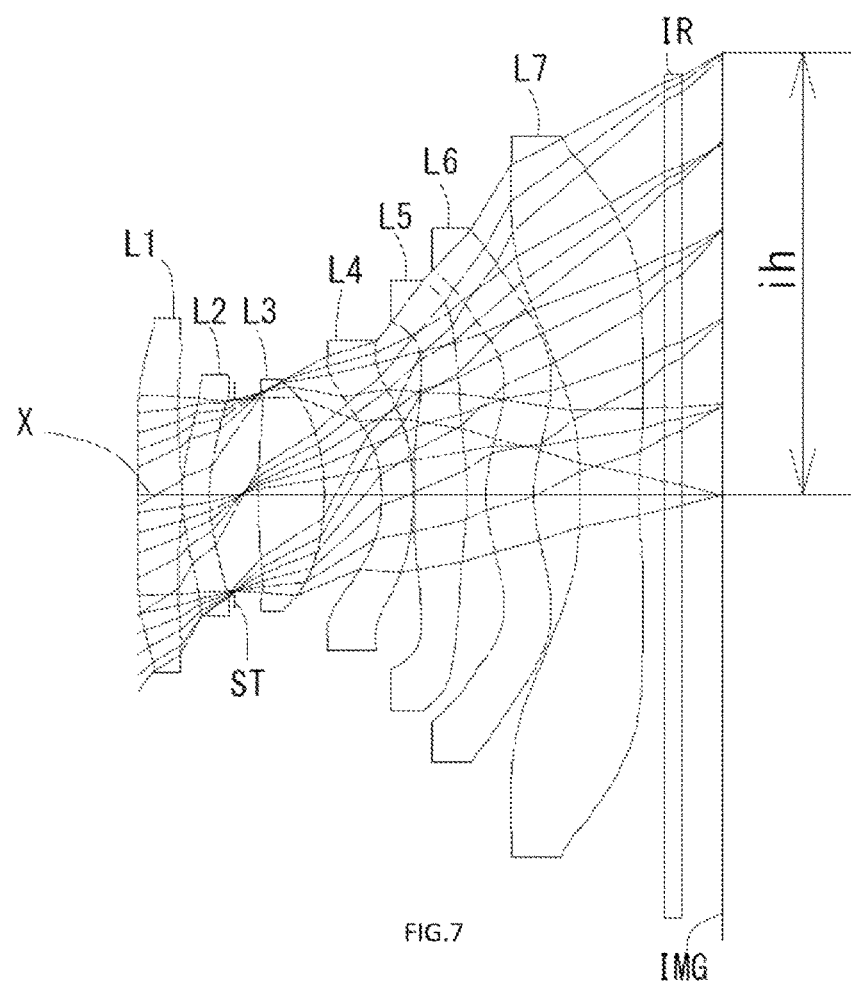
FIG. 7 is a schematic view showing an imaging lens in Example 4 according to the present invention.

FIG. 6 shows spherical aberration (mm), astigmatism (mm), and distortion (%) of the imaging lens in Example 3. As shown in FIG. 6, each aberration is corrected excellently.

EXAMPLE 4

The basic lens data is shown below in Table 4.

TABLE 4

Example 4

Unit mm $f = 4.41$
$Fno = 1.80$
$\omega(°) = 50.2$
$ih = 5.20$
$TTL = 6.82$

Surface Data

| i | r | d | Nd | vd |
|---|---|---|---|---|
| (Object) | Infinity | Infinity | | |
| 1* | −15.4139 | 0.5123 | 1.544 | 56.44 (vd1) |
| 2* | −4.7303 | 0.0150 | | |
| 3* | 2.3460 | 0.3156 | 1.671 | 19.24 (vd2) |
| 4* | 1.9483 | 0.3086 | | |
| 5 (Stop) | Infinity | 0.2626 | | |
| 6* | 6.7906 | 0.7801 | 1.535 | 55.69 (vd3) |
| 7* | −3.2869 | 0.6836 | | |
| 8* | −1.7972 | 0.3645 | 1.671 | 19.24 (vd4) |
| 9* | −4.6350 | 0.0150 | | |
| 10* | −37.3903 | 0.6164 | 1.544 | 56.44 (vd5) |
| 11* | −3.9127 | 0.2262 | | |
| 12* | 1.5339 | 0.5613 | 1.671 | 19.24 (vd6) |
| 13* | 1.5538 | 0.5432 | | |
| 14* | 62.5975 | 0.7000 | 1.535 | 55.69 (vd7) |
| 15* | 4.3607 | 0.3000 | | |
| 18 | Infinity | 0.2100 | 1.517 | 64.20 |
| 19 | Infinity | 0.4722 | | |
| Image Plane | Infinity | | | |

Constituent Lens Data

| Lens | Start Surface | Focal Length |
|---|---|---|
| 1 | 1 | 12.327 |
| 2 | 3 | −25.147 |
| 3 | 6 | 4.256 |
| 4 | 8 | −4.614 |
| 5 | 10 | 7.975 |
| 6 | 12 | 14.488 |
| 7 | 14 | −8.801 |

TABLE 4-continued

Example 4

Aspheric Surface Data

|     | First Surface | Second Surface | Third Surface | Fourth Surface | Sixth Surface |
|-----|---------------|----------------|---------------|----------------|---------------|
| k   | 0.000000E+00  | 0.000000E+00   | 0.000000E+00  | 0.000000E+00   | 0.000000E+00  |
| A4  | 4.426394E−02  | 1.187002E−01   | −6.004227E−02 | −1.706298E−01  | −8.577157E−03 |
| A6  | −2.327995E−02 | −1.157073E−01  | −4.608720E−03 | 1.864010E−01   | −3.027017E−02 |
| A8  | 1.829555E−02  | 1.244525E−01   | 1.910371E−02  | −2.779818E−01  | 5.650167E−02  |
| A10 | −1.011861E−02 | −1.006579E−01  | −2.824778E−02 | 2.962251E−01   | −1.060082E−01 |
| A12 | 3.539015E−03  | 5.567959E−02   | 1.455481E−02  | −2.034976E−01  | 1.232576E−01  |
| A14 | −7.346701E−04 | −2.043410E−02  | −2.343790E−03 | 7.909669E−02   | −9.055756E−02 |
| A16 | 7.868983E−05  | 4.704485E−03   | 0.000000E+00  | −1.192825E−02  | 3.651721E−02  |
| A18 | −3.206694E−06 | −6.106044E−04  | 0.000000E+00  | 0.000000E+00   | −5.821089E−03 |
| A20 | 0.000000E+00  | 3.398842E−05   | 0.000000E+00  | 0.000000E+00   | 0.000000E+00  |

|     | Seventh Surface | Eighth Surface | Ninth Surface | Tenth Surface | Eleventh Surface |
|-----|-----------------|----------------|---------------|---------------|------------------|
| k   | 1.556592E+00    | 0.000000E+00   | 0.000000E+00  | 0.000000E+00  | 0.000000E+00     |
| A4  | −2.397334E−02   | −2.317078E−01  | −1.570946E−01 | 1.965673E−01  | 2.949169E−02     |
| A6  | −5.064464E−02   | 5.525204E−01   | 2.392780E−01  | −2.700715E−01 | 8.308701E−02     |
| A8  | 1.108672E−01    | −8.938362E−01  | −3.561126E−01 | 2.557666E−01  | −9.124832E−02    |
| A10 | −1.577207E−01   | 9.713274E−01   | 3.309687E−01  | −1.852837E−01 | 4.367386E−02     |
| A12 | 1.229118E−01    | −6.635227E−01  | −1.823757E−01 | 9.581295E−02  | −1.197242E−02    |
| A14 | −5.020709E−02   | 2.874009E−01   | 6.206510E−02  | −3.334549E−02 | 2.037687E−03     |
| A16 | 8.394567E−03    | −7.675993E−02  | −1.298446E−02 | 7.356270E−03  | −2.189236E−04    |
| A18 | 0.000000E+00    | 1.151602E−02   | 1.548200E−03  | −9.274818E−04 | 1.397038E−05     |
| A20 | 0.000000E+00    | −7.398392E−04  | −8.130000E−05 | 5.071105E−05  | −4.105008E−07    |

|     | Twelfth Surface | Thirteenth Surface | Fourteenth Surface | Fifteenth Surface |
|-----|-----------------|--------------------|--------------------|-------------------|
| k   | −8.734524E+00   | −9.314254E+00      | 0.000000E+00       | 0.000000E+00      |
| A4  | −2.147537E−02   | −3.740352E−02      | −1.647134E−01      | −9.550239E−02     |
| A6  | −1.133301E−03   | 5.995195E−03       | 8.920998E−02       | 3.772603E−02      |
| A8  | −8.785381E−03   | −3.885859E−03      | −2.675224E−02      | −8.686744E−03     |
| A10 | 7.696092E−03    | 1.404605E−03       | 4.938097E−03       | 1.225552E−03      |
| A12 | −4.107572E−03   | −3.104224E−04      | −5.781215E−04      | −1.114126E−04     |
| A14 | 1.292619E−03    | 4.905823E−05       | 4.308854E−05       | 6.541232E−06      |
| A16 | −2.218048E−04   | −5.095907E−06      | −1.984418E−06      | −2.390863E−07     |
| A18 | 1.921759E−05    | 2.923762E−07       | 5.156088E−08       | 4.938606E−09      |
| A20 | −6.595976E−07   | −6.848465E−09      | −5.787489E−10      | −4.408180E−11     |

The imaging lens in Example 4 satisfies conditional expressions (1) to (16) as shown in Table 6.

Figure 8:
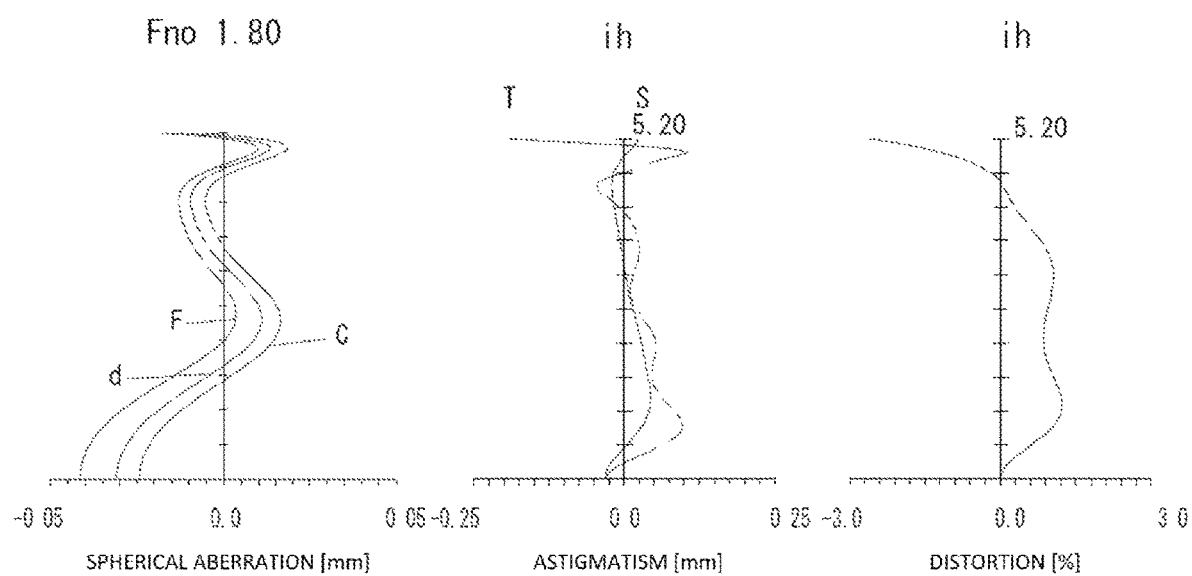
FIG. 8 shows spherical aberration, astigmatism, and distortion of the imaging lens in Example 4 according to the present invention.

FIG. 8 shows spherical aberration (mm), astigmatism (mm), and distortion (%) of the imaging lens in Example 4. As shown in FIG. 8, each aberration is corrected excellently.

EXAMPLE 5

The basic lens data is shown below in Table 5.

TABLE 5

Example 5

Unit mm f = 4.41
Fno = 1.80
ω(°) = 50.0
ih = 5.20
TTL = 6.77

Surface Data

| i        | r        | d        | Nd    | vd          |
|----------|----------|----------|-------|-------------|
| (Object) | Infinity | Infinity |       |             |
| 1*       | −5.1318  | 0.3612   | 1.614 | 25.59 (vd1) |
| 2*       | −5.8640  | 0.0150   |       |             |
| 3*       | 2.1185   | 0.4171   | 1.544 | 56.44 (vd2) |
| 4*       | 2.9266   | 0.2138   |       |             |
| 5 (Stop) | Infinity | 0.2956   |       |             |
| 6*       | 11.2998  | 0.7119   | 1.535 | 55.69 (vd3) |
| 7*       | −3.3882  | 0.8107   |       |             |

TABLE 5-continued

Example 5

| | | | | |
|---|---|---|---|---|
| 8* | −1.7411 | 0.3500 | 1.671 | 19.24 (vd4) |
| 9* | −4.4001 | 0.0150 | | |
| 10* | −16.0844 | 0.7839 | 1.544 | 56.44 (vd5) |
| 11* | −2.6672 | 0.0378 | | |
| 12* | 1.6100 | 0.5686 | 1.671 | 19.24 (vd6) |
| 13* | 1.4437 | 0.5786 | | |
| 14* | 33.2409 | 0.7000 | 1.535 | 55.69 (vd7) |
| 15* | 4.4690 | 0.3000 | | |
| 18 | Infinity | 0.2100 | 1.517 | 64.20 |
| 19 | Infinity | 0.4751 | | |
| Image Plane | Infinity | | | |

Constituent Lens Data

| Lens | Start Surface | Focal Length |
|---|---|---|
| 1 | 1 | −82.380 |
| 2 | 3 | 11.921 |
| 3 | 6 | 4.958 |
| 4 | 8 | −4.535 |
| 5 | 10 | 5.754 |
| 6 | 12 | 66.660 |
| 7 | 14 | −9.737 |

Aspheric Surface Data

| | First Surface | Second Surface | Third Surface | Fourth Surface | Sixth Surface |
|---|---|---|---|---|---|
| k | 0.000000E+00 | 0.000000E+00 | 0.000000E+00 | 0.000000E+00 | 0.000000E+00 |
| A4 | 9.142448E−02 | 8.169247E−02 | −8.131085E−02 | −1.051246E−01 | −1.625675E−02 |
| A6 | −6.884655E−02 | −1.614422E−02 | 1.211228E−01 | 1.570491E−01 | −9.782568E−02 |
| A8 | 6.748080E−02 | −1.335855E−02 | −3.194752E−01 | −4.471011E−01 | 3.237385E−01 |
| A10 | −4.456018E−02 | 5.111209E−02 | 6.223224E−01 | 9.298553E−01 | −7.634999E−01 |
| A12 | 1.703890E−02 | −6.255486E−02 | −8.027952E−01 | −1.262144E+00 | 1.104730E+00 |
| A14 | −2.916918E−03 | 3.872523E−02 | 6.470218E−01 | 1.072306E+00 | −1.004307E+00 |
| A16 | −1.662958E−04 | −1.211653E−02 | −3.141520E−01 | −5.455067E−01 | 5.557794E−01 |
| A18 | 1.346107E−04 | 1.484534E−03 | 8.363369E−02 | 1.499248E−01 | −1.711312E−01 |
| A20 | −1.386192E−05 | 1.266272E−05 | −9.252885E−03 | −1.647224E−02 | 2.253404E−02 |

| | Seventh Surface | Eighth Surface | Ninth Surface | Tenth Surface | Eleventh Surface |
|---|---|---|---|---|---|
| k | 2.775143E+00 | 0.000000E+00 | 0.000000E+00 | 0.000000E+00 | 0.000000E+00 |
| A4 | −2.505735E−02 | −1.852683E−01 | −1.826499E−01 | 1.546948E−01 | 8.937599E−02 |
| A6 | −3.479284E−02 | 4.297653E−01 | 3.321773E−01 | −1.703613E−01 | −2.215601E−02 |
| A8 | 4.545957E−02 | −6.569296E−01 | −4.844002E−01 | 1.072957E−01 | 4.214381E−03 |
| A10 | −3.049134E−02 | 6.666670E−01 | 4.315165E−01 | −5.026992E−02 | −7.917523E−03 |
| A12 | −2.604688E−02 | −4.018237E−01 | −2.290185E−01 | 1.858137E−02 | 5.529895E−03 |
| A14 | 6.295606E−02 | 1.415824E−01 | 7.451088E−02 | −5.212136E−03 | −1.700216E−03 |
| A16 | −4.784134E−02 | −2.699725E−02 | −1.466772E−02 | 1.014050E−03 | 2.703765E−04 |
| A18 | 1.688995E−02 | 2.116780E−03 | 1.605597E−03 | −1.205488E−04 | −2.201454E−05 |
| A20 | −2.359519E−03 | 1.000000E−05 | −7.486622E−05 | 6.510047E−06 | 7.320648E−07 |

| | | Twelfth Surface | Thirteenth Surface | Fourteenth Surface | Fifteenth Surface |
|---|---|---|---|---|---|
| | k | −1.050193E+01 | −8.478520E+00 | 0.000000E+00 | 0.000000E+00 |
| | A4 | 1.583719E−02 | −4.761329E−02 | −1.661793E−01 | −8.970432E−02 |
| | A6 | −6.555494E−02 | 1.663649E−02 | 8.923855E−02 | 3.582294E−02 |
| | A8 | 5.418326E−02 | −9.675492E−03 | −2.675124E−02 | −8.551046E−03 |
| | A10 | −3.131891E−02 | 3.463087E−03 | 4.938137E−03 | 1.271425E−03 |
| | A12 | 1.123206E−02 | −7.530780E−04 | −5.781215E−04 | −1.231789E−04 |
| | A14 | −2.441990E−03 | 1.041077E−04 | 4.308855E−05 | 7.791369E−06 |
| | A16 | 3.185596E−04 | −8.883984E−06 | −1.984404E−06 | −3.106068E−07 |
| | A18 | −2.317981E−05 | 4.217292E−07 | 5.156225E−08 | 7.091847E−09 |
| | A20 | 7.263738E−07 | −8.446763E−09 | −5.789449E−10 | −7.081930E−11 |

The imaging lens in Example 5 satisfies conditional expressions (1) to (16) as shown in Table 6.

Figure 10:
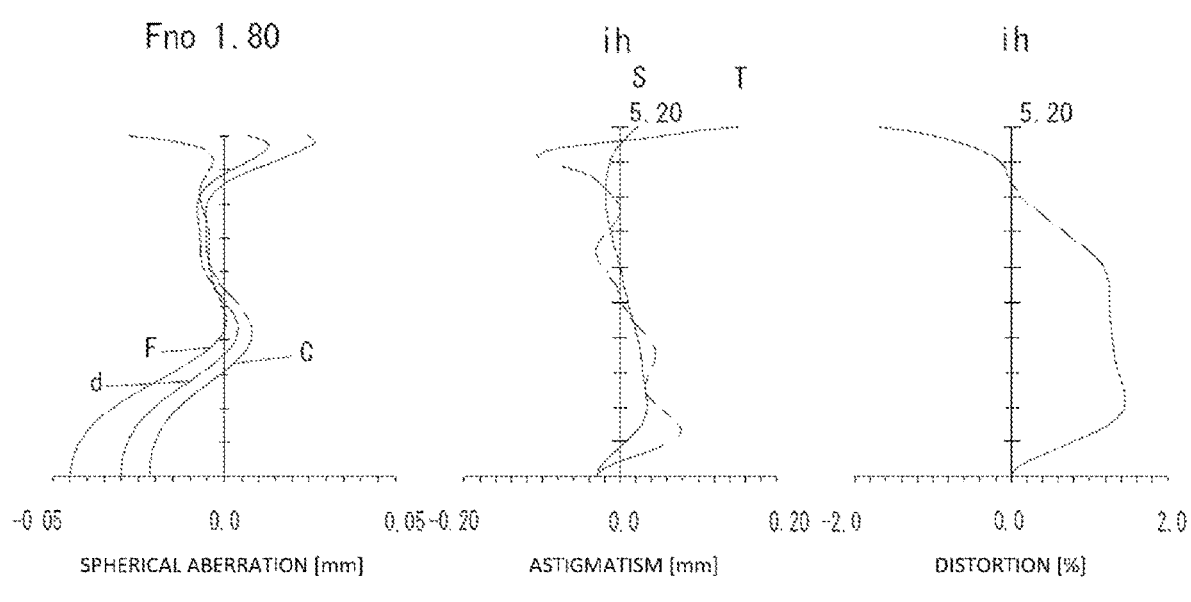
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

In table 6, values of conditional expressions (1) to (16) related to the Examples 1 to 5 are shown.

TABLE 7

| | | Conditional Expressions | Example 1 | Example 2 | Example 3 | Example 4 | Example 5 |
|---|---|---|---|---|---|---|---|
| * | (1) | (T1/TTL) × 100 | 0.22 | 0.22 | 0.22 | 0.22 | 0.22 |
| * | (2) | T2/T4 | 37.23 | 36.77 | 37.25 | 38.08 | 33.96 |
| * | (3) | vd6 | 19.24 | 19.24 | 19.24 | 19.24 | 19.24 |
| * | (4) | vd6/vd7 | 0.35 | 0.35 | 0.35 | 0.35 | 0.35 |
| * | (5) | (D1/|f1|)× 100 | 5.22 | 4.26 | 4.20 | 4.16 | 0.44 |
| * | (6) | (T4/TTL) × 100 | 0.22 | 0.22 | 0.22 | 0.22 | 0.22 |
| * | (7) | T1/T2 | 0.03 | 0.03 | 0.03 | 0.03 | 0.03 |
| * | (8) | f3/f | 0.96 | 0.98 | 0.96 | 0.97 | 1.12 |
| * | (9) | f4/f | −0.91 | −0.97 | −1.01 | −1.05 | −1.03 |
| * | (10) | f5/f | 1.38 | 1.52 | 1.57 | 1.81 | 1.31 |
| * | (11) | f5/f7 | −0.69 | −0.77 | −0.79 | −0.91 | −0.59 |
| * | (12) | r1/f | −4.16 | −2.89 | −2.94 | −3.50 | −1.16 |
| * | (13) | r2/f | −0.98 | −0.98 | −1.00 | −1.07 | −1.33 |
| * | (14) | r11/f | 0.42 | 0.41 | 0.37 | 0.35 | 0.37 |
| * | (15) | r12/f | 0.41 | 0.41 | 0.36 | 0.35 | 0.33 |
| * | (16) | r13/f | 15.28 | 16.63 | 13.73 | 14.20 | 7.54 |

When the imaging lens according to the present invention is adopted to a product with the camera function, there is realized contribution to the wide field of view, the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
L7: seventh lens
ih: maximum image height
IR: filter
IMG: imaging plane

What is claimed:

1. An imaging lens comprising in order from an object side to an image side,
a first lens with positive or negative refractive power in a paraxial region,
a second lens with positive or negative refractive power in a paraxial region,
a third lens with positive refractive power in a paraxial region,
a fourth lens with negative refractive power in a paraxial region,
a fifth lens with positive refractive power in a paraxial region,
a sixth lens with positive refractive power in a paraxial region, and
a seventh lens with negative refractive power,
wherein an image-side surface of said first lens is convex in the paraxial region, an object-side surface of said second lens is convex in the paraxial region, and an image-side surface of said sixth lens is concave in the paraxial region, and
wherein the following conditional expressions (4) and (5) are satisfied:

$$0.10 < vd6/vd7 < 0.60 \quad (4)$$

$$0.20 < (D1/|f1|) \times 100 < 7.50 \quad (5)$$

where
vd6: an abbe number at d-ray of the sixth lens,
vd7: an abbe number at d-ray of the seventh lens,
D1: a thickness of the first lens along the optical axis, and
f1: a focal length of the first lens.

2. The imaging lens according to claim 1, wherein an object-side surface of said first lens is concave in the paraxial region.

3. The imaging lens according to claim 1, wherein an object-side surface of said fourth lens is concave in the paraxial region.

4. The imaging lens according to claim 1, wherein an image-side surface of said fourth lens is convex in the paraxial region.

5. The imaging lens according to claim 1, wherein an object-side surface of said sixth lens is convex in the paraxial region.

6. The imaging lens according to claim 1, wherein the following conditional expression (1) is satisfied:

$$0.10 < (T1/TTL) \times 100 < 0.45 \quad (1)$$

where
T1: a distance along the optical axis from an image-side surface of the first lens to an object-side surface of the second lens, and
TTL: a total track length.

7. The imaging lens according to claim 1, wherein the following conditional expression (2) is satisfied:

$$10.00 < T2/T4 \quad (2)$$

where
T2: a distance along the optical axis from an image-side surface of the second lens to an object-side surface of the third lens, and
T4: a distance along the optical axis from an image-side surface of the fourth lens to an object-side surface of the fifth lens.

* * * * *